United States Patent [19]
Hawkins et al.

[11] Patent Number: 5,842,063
[45] Date of Patent: Nov. 24, 1998

[54] CAMERA AND FILM FOR RECORDING OVERLAPPING IMAGES

[75] Inventors: Gilbert A. Hawkins, Mendon; Annabel A. Muenter, Rochester; Philip T. Lau, Rochester; John D. Baloga, Rochester, all of N.Y.

[73] Assignee: Eastman Kodak Company, Rochester, N.Y.

[21] Appl. No.: 740,541

[22] Filed: Oct. 30, 1996

[51] Int. Cl.$^6$ ........................................... G03C 7/00
[52] U.S. Cl. .............. 396/315; 396/317; 255/2; 255/39
[58] Field of Search .......... 355/2, 39; 396/315, 396/317

[56] References Cited

U.S. PATENT DOCUMENTS

| | | | |
|---|---|---|---|
| 4,469,779 | 9/1984 | Suits | 430/363 |
| 5,678,084 | 10/1997 | Hori | 396/317 |

*Primary Examiner*—Daniel P. Malley
*Attorney, Agent, or Firm*—Raymond L. Owens

[57] ABSTRACT

A camera and film for recording overlapping visual images and digital data is disclosed. The camera includes a structure for recording the region of a film with visible light to record a visible image in one or more record layer(s) sensitized to visible light; and a structure for recording in the region of the film with non-visible light to record digital data in one or more record layer(s) sensitized to non-visible light, whereby overlapping visual and digital data images are recorded in the same region.

8 Claims, 7 Drawing Sheets

CAMERA AND FILM FOR RECORDING OVERLAPPING IMAGES

FIELD OF THE INVENTION

The present invention relates to a photographic camera which can record overlapping information and a film for use with this camera.

BACKGROUND OF THE INVENTION

Still camera users frequently desire to enhance or document individual pictures with supplementary information, such as text captions or brief audio segments that can be conveniently accessed during viewing of the image. The need for audio segments has been previously recognized, for example, in U.S. Pat. No. 3,920,862 which discloses a method of recording sound magnetically in association with still pictures. Nonetheless, such camera systems are not in common use today, owing to the fact that most methods suffer disadvantages due to cumbersome peripheral recording means, specialized data storage means and/or cumbersome playback means, and to the difficulty of synchronizing these functions with image display (see for example, U.S. Pat. No. 5,128,700). Optical recording of data such as sound directly on conventional films eliminates the need for separate storage means but may reduce the number of conventional images that can be stored or reduce the image size, there being a tradeoff between the amount of digital and pictorial information recorded. Also, a conventional film is not optimized for recording high density digital data. For example, the grain of a conventional film is made larger than that desired for digital recording in order to increase photographic speed.

In commonly-assigned U.S. Pat. No. 5,389,989 to Hawkins et al there is described a camera for recording both digital and pictorial images on a photographic film. Although this camera is quite effective, these images are recorded in separate regions of the film spaced from each other and therefore have the problem that they use additional film.

SUMMARY OF THE INVENTION

In view of the foregoing, it is an object of this invention to provide a photographic camera which can be used to record overlapping images.

It is a further object of the present invention to provide a photographic camera which can record both scene information and digital information in the same region of the film but in overlapping record layers of the film.

These objects are achieved in a photographic camera for recording images of a subject on a photographic film, the photographic film including one or more record layers sensitized to a region in the non-visible portion of the spectrum and one or more record layers conventionally sensitized to the visible region of the spectrum and not exposable by the non-visible wavelengths exposing the record layer or record layer(s) sensitized to the non-visible portion of the spectrum; the record layer or record layers sensitive to the non-visible portion of the spectrum being rendered, upon exposure and development, imagewise absorptive of light at wavelengths not substantially absorbed by the dyes produced by the conventionally sensitized layers and substantially less absorptive of visible light than the exposed and developed record layers sensitized to wavelengths in the visible region of the spectrum, the camera comprising:

a) means for advancing the film;

b) optical recording means for exposing the non-visible sensitized record layer(s) of the film with non-visible radiation; and for exposing the visible sensitized record layer(s) with visible radiation in a region of the film layer whereby there are overlapping exposed visible and non-visible sensitized record layers in the film.

An advantage of this invention is to enable spatially overlapping records of digital data and conventional scene pictures.

This invention provides the user of a camera equipped for digital recording with the ability to store overlapping digital data in a film, while still permitting the user to make use of conventional film when the user does not desire to record digital data.

A further advantage is to afford a user the ability to record large amounts of digital data such as sound or text in the same location as a conventional image, thereby ensuring that the image and the digital data remain associated.

DESCRIPTION OF THE PREFERRED EMBODIMENTS

Figure 1:
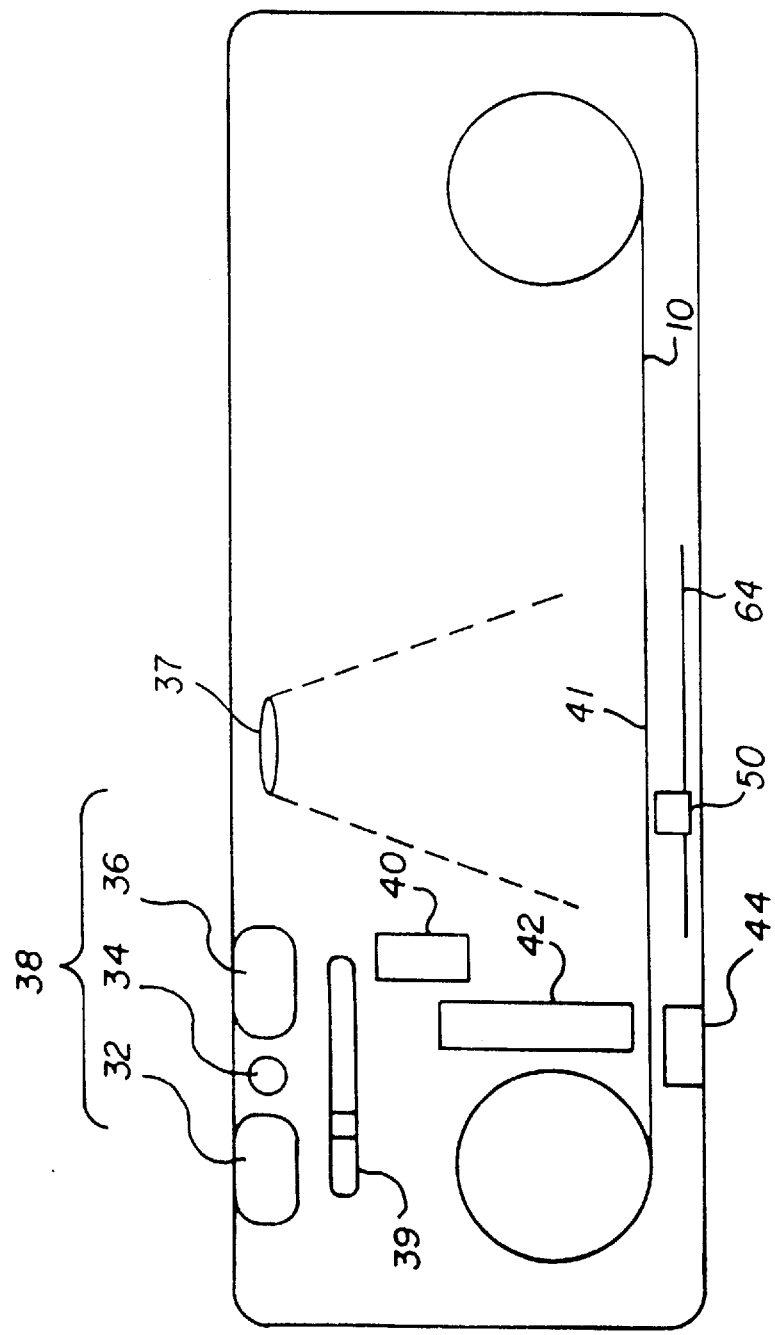
FIG. 1 is a top view of a camera which can use a film in accordance with the present invention.
Figure 2:
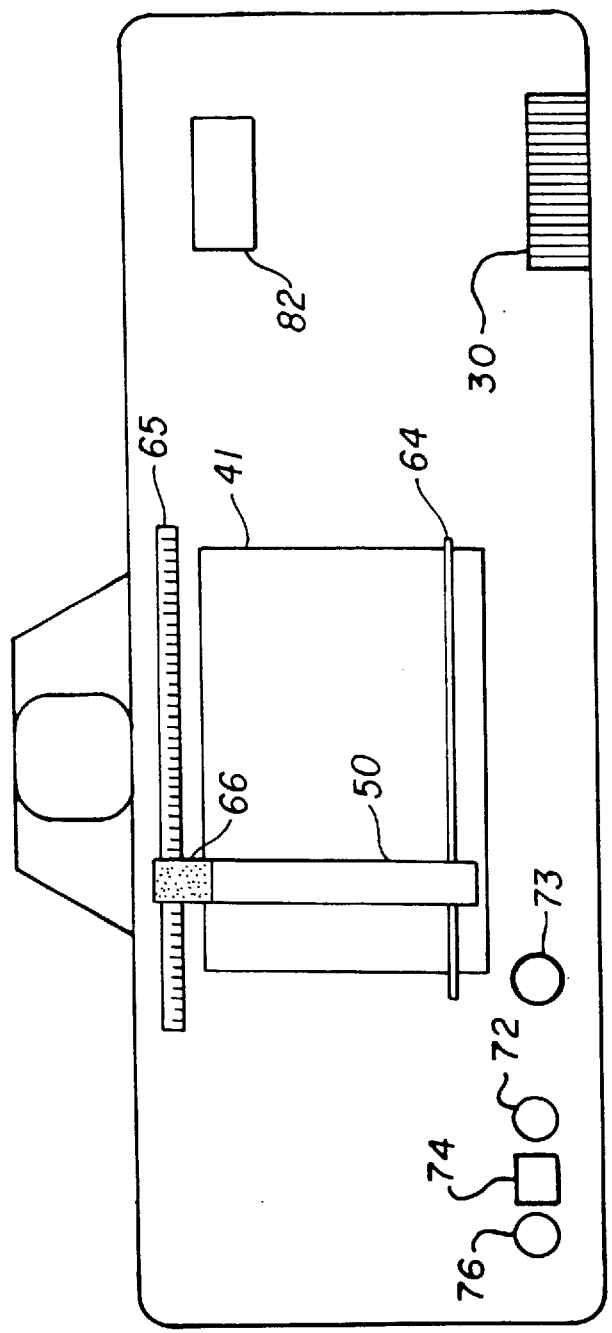
FIG. 2 is a rear view of the camera of FIG. 1.

The essential features of the camera depicted in topview FIG. 1 and backview FIG. 2 are image capability in the conventional photographic sense (i.e., ability to allow picture taking on conventional film records sensitive to the visible portion of the spectrum) and electronic, mechanical, and optical capability for acquiring and writing digital information to the film at wavelengths which do not expose the visible color records of conventional film and to have these images overlap. (For example, such a wavelength might lie in the infra-red region of the spectrum.) The essential feature of the film for this camera is incorporation of a recording layer(s) which can be exposed by the digital camera writer but which is not exposed by the taking of conventional images at visible wavelengths. The film must have the capability to produce an imagewise, record, upon exposure by the digital writer, which, upon development, absorbs primarily in regions of the spectrum at which the developed visible layers do not absorb or which absorbs a sufficiently small amount in the visible spectrum to enable the visible record to be correctly interpreted when account is taken of any spectral overlap. (For example, such a wavelength might also lie in the infra-red region of the spectrum and might be the same or different from the wavelength of the digital writer in the camera.) The preferred embodiment of the camera will refer to an infra-red digital exposure and a film record sensitive to this exposure and producing an infra-red optical density. The preferred embodiment will refer to the source of digital data being audio captured by a microphone or from an external digital source.

It is an important feature of this invention that overlapping images can be formed in the film. In a preferred embodiment, for the same region of the film, one or more record layer(s) is sensitive to infrared light and other record layer(s) is sensitive to visible light. In this way, overlapping visible and non-visible images are formed. The non-visible record layer(s) of the film is particularly suitable for recording digital data and so, as will be described, there is a camera which is capable of recording conventional images which overlap digital data.

Figure 4:
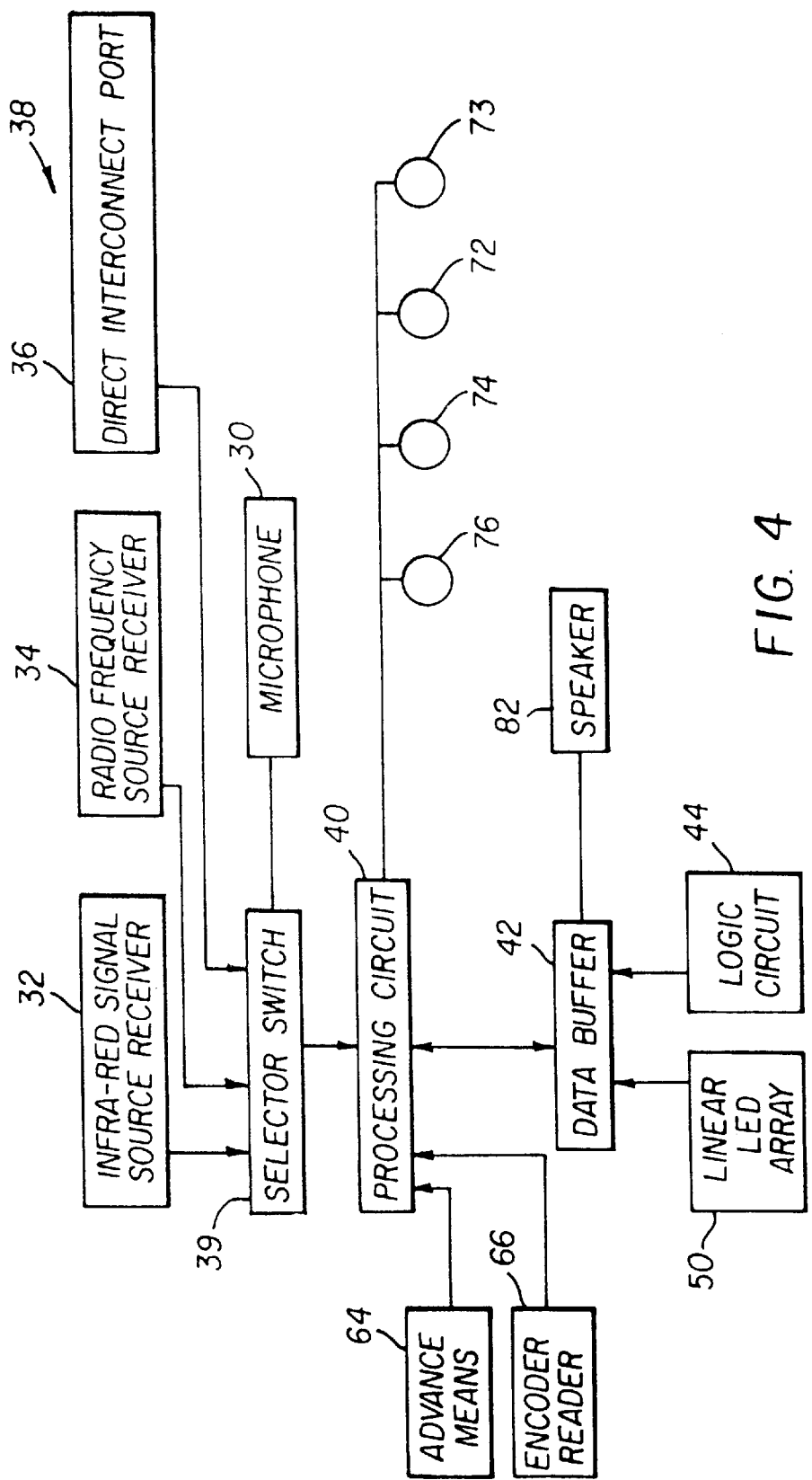
FIG. 4 shows a schematic circuit diagram for operating the camera of FIGS. 1 and 2.

The camera functions are first discussed. Referring to FIGS. 1, 2, and 4, a camera lens 37 is provided for focusing light from an image scene onto a region of the film in an exposure gate 41 for exposing with visible radiation a film record layer sensitized to visible light. A microphone 30 is provided for audio recording as well as a receiver 38 for receiving digital data from at least one external source type, such as an intensity modulated infra-red signal source 32, a radio frequency source 34, or a direct electrical or optical interconnect port 36. A signal from any one of these sources is user selected by selector switch 39 on the camera, is processed digitally by semiconductor processing circuit 40, and is stored in data buffer 42 for subsequent optical encoding on a portion of the film at the film gate. It will be appreciated by those skilled in the art that the digital electronic capabilities can be implemented in many ways using conventional semiconductor components.

The data source is selected by selector switch 39, when a record data button 74 is activated, and data is immediately recorded on the film backside in the region of the exposure gate 41 by movable linear emitter array 50 until this region is filled or until the data stream is terminated. An image of a scene taken through lens 37 and focused on a region of the film taken in association with this data is then permanently linked to the data by virtue of spatial collocation. In a second embodiment, the recorded information is stored in the a buffer 42 for later verification by selection of the verify first mode using verify first button 76 and speaker 82. After verification, obtained by pressing verify buffer button 72, the user then may elect to transfer the contents of the buffer to the film in the exposure gate region using record buffer button 73. It will be understood that it is optional as to which is recorded first, the scene image or the non-visible information such as digital data. What is important is that the recorded scene information and non-visible information overlap.

It will be appreciated that many variants of the data acquisition and record process are possible, for example advancing the film to a predetermined frame before recording in the same location visible and invisible information. As another example, digital information generated within the camera may also be recorded on the film in association with particular frames of conventional images, either automatically or by user command.

Figure 3:
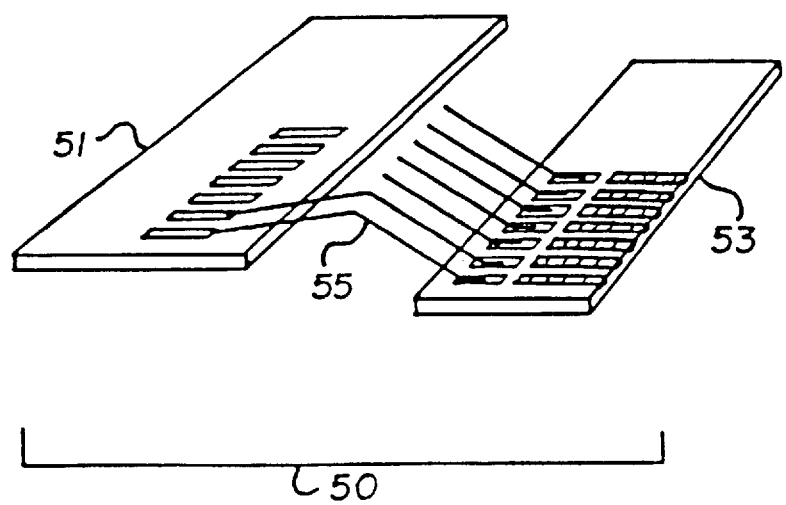
FIG. 3 shows the construction of the linear edge-emitter array used to expose a film in accordance with the present invention.

Recording of the digital information onto the film in accordance with this invention in the camera of FIGS. 1 and 2 may be accomplished by a variety of structures. In the particular embodiment shown in FIG. 3, a high density linear emitter array 50 including edge emitting linear LED array 53, fabricated by means practiced commonly in the art, using semiconductor light emitting materials such as GaAs, InP, AlGaInAs, or GaInP, contacts the film back surface and is scanned over the region of the exposure gate 41. Exposure of the non-visible record layer is accomplished by emitters whose intensities are individually controlled by semiconductor driver circuit 51, connected by wire bonds 55 to LED array 53, in response to the information received as selected by selector 39 of FIG. 1. As is known, in the art, alternative ways of modulating the light emitters such as optical switches in the light guides, may also serve the purpose of optical exposure. Array advance means 64 comprised, for example, of a rotating lead screw, moves the linear LED array 50 over the exposure gate region 41 to cause individual bits of information recorded to be recorded in the non-visible record layer but in overlapping relationship with the recorded image scene. The digital information can be provided by two-dimensional array of "dots" recorded as latent images in the non-visible record layer. The logic circuit 44 preferentially controls the rate of array advance during digital recording so that array motion is synchronized to the activation of the emitters in the array by optical encoder track 65 on the camera body and encoder reader 66 on movable linear emitter array 50. This procedure ensures that the digital data is recorded in as small a space as possible. The LED array 53 preferably forms a line array with emitter to emitter spacing preferably in the range 2 to 200 microns and emitting over only a narrow spectral range in the infra-red, for example over a range of from 700 to 740 nm. It is to be recognized by those familiar with film exposure that arrangements other than movable line arrays may be employed to record the digital information, for example two-dimensional LED arrays or laser arrays, or movable mechanical systems such as mirrors or lenses.

Figure 5A:
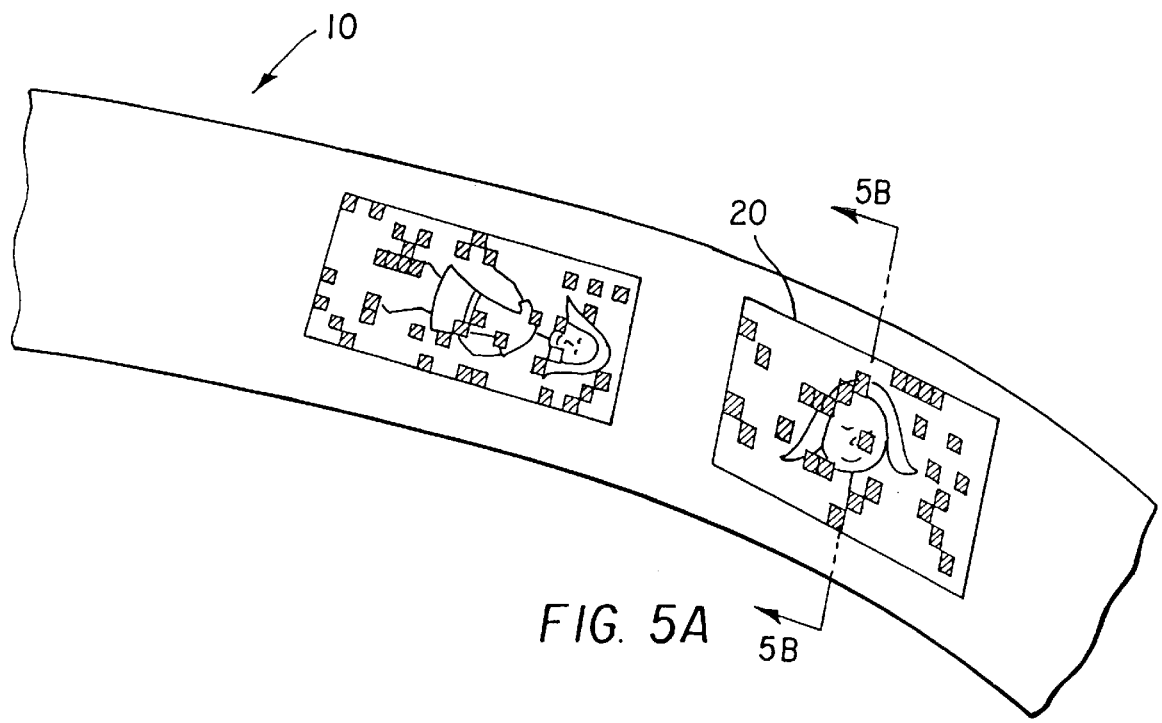
FIG. 5A shows a film in accordance with this invention.
Figure 5B:
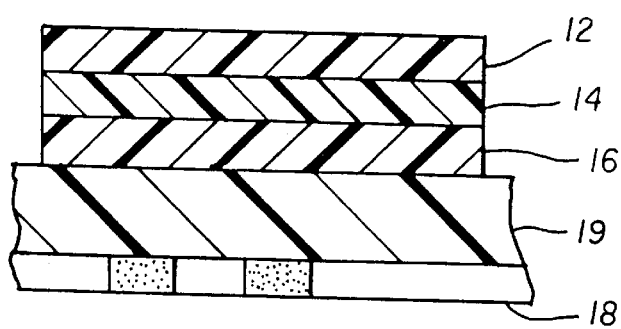
FIG. 5B shows a cross-section of the film taken along the lines 5B—5B of FIG. 5A.

Turning now to the preferred embodiment of the film, with reference to FIG. 5A, region 20 of the film 10, typically exposed in accordance with this invention, is shown in cross-section in FIG. 5B to contain conventional photographic color records (layers 12, 14 and 16) sensitive to red, blue and green light coated sequentially on a conventional film base 19. In addition, a record layer (layer 18) sensitized in the infrared region of the spectrum is shown coated on the opposite side of film base 19. A visual image, the record of which is shown schematically by a face in region 20 of film 10 in FIG. 5A, has been established in each of the three visible color sensitive record layers 12, 14, and 16. A digital image, the record of which is shown schematically in FIG. 5A by a pattern of dots in region 20, has been established in the infrared-sensitive record layer 18. The shading in cross-section 5B indicates the presence of a latent image in the infrared-sensitive record layer 18. The latent images in the visible color sensitive record layers 12, 14, and 16 are not shown in the cross-section for clarity.

After exposure and processing, absorption in the visible spectrum in the layers 12, 14, and 16 superimposes to provide full spectral image content in the conventional photographic sense. There is no appreciable interference from infrared record 18 in viewing or printing this image because, in accordance with this invention, layer 18 does not absorb appreciably in the visible region of the spectrum, in either the exposed (shaded) or the unexposed regions. As shown in FIG. 5B, layer 18 has been used in accordance with this invention to store digital data in the film 10 in the same region as the visual image in overlapping record layers in response to a particular information source chosen by the user. In the case drawn, the film space taken by this information is in the same film region 20 that is occupied by the conventional pictures. Because records 12, 14, and 16 do not absorb strongly in the infra-red, either in the exposed or the unexposed regions, as is well known in the state of the art of conventional photographic science, whereas layer 18, in accordance with this invention, absorbs in the infra-red in regions where it was exposed, the digital data record stored in layer 18, depicted by dots in region 20, may be retrieved by measuring the infra-red transmission through the film, as may be done, for example, by scanning the film for optical density in the infra-red portion of the spectrum. Film 10 thereby permits optimal use of mixed pictorial/non-pictorial recording, since the digital and pictorial information may be spatially overlapped. This format also provides higher potential storage densities of digital information than would conventional film color records, because layer 18 can be optimized for digital recording, for example in speed and grain, independent of the need to capture conventional images.

The film claimed in accordance with this invention is accomplished by the addition of layer 18 to an otherwise conventional photographic film, either on the film substrate back surface, as described in the detailed embodiment herein, or as an additional layer on the front surface of the substrate, preferably the layer nearest the substrate, as taught in commonly-assigned U.S. Pat. No. 5,108,882 issued Apr. 28, 1992 to Parton et al which gives recipes for the incorporation of multilayer coatings one or more of which are infra-red sensitized.

The infra-red sensitive layer can be comprised of AgCl, AgBr, AgBrI or other mixed halide emulsions which may be cubic, octahedral, or tabular in their morphology. Emulsions of cubic morphology are particularly useful because of their resistance to dye desensitization by the infra-red dyes. These emulsions can be chemically sensitized with typical treatments of sulfur and/or gold containing compounds. The sensitizing dyes used are typically dicarbo, tricarbo or tetracarbo cyanine dyes which may contain a variety of heterocyclic ring structures and various other substituents. Also, various addenda, especially substituted bis-azine compounds, are useful in combination with the dyes to improve their sensitizing ability. Other addenda, such as tetraazaindenes or phenylmercaptotetrazoles (See James, The Theory of The Photographic Process, 4th Edition, MacMillen, New York, 1977, Chapter 13) are useful to improve the keeping stability of the dyed emulsions. The infra-red couplers useful in the present invention are typically 1-naphthols containing a variety of carboamido substituents at the 2-position of the naphtholic ring.

A preferred embodiment of this layer is now described beginning with a preferred class of infra-red sensitive dyes. Formula I shows a preferred class of infra-red sensitizers having the formula:

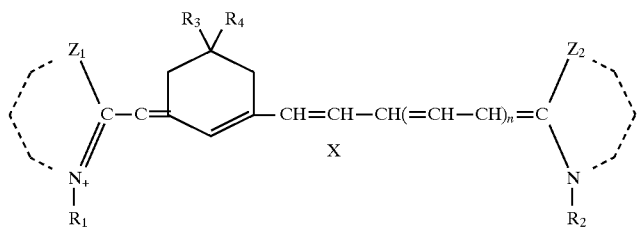

Formula 1 wherein:

$Z_1$ and $Z_2$ each independently represents the atoms necessary to complete a substituted or unsubstituted 5- or 6-membered heterocyclic nucleus;

$R_1$ and $R_2$ each independently represents substituted or unsubstituted alkyl;

$R_3$ and $R_4$ each independently represents hydrogen, substituted or unsubstituted alkyl, substituted or unsubstituted aryl;

n is 0 or 1; and

X represents a counterior.

Examples of dyes according to Formula I are set forth below in Tables I and II.

TABLE I

| Dye | $W_1$ | $W_2$ | Z |
|---|---|---|---|
| I-1 | H | H | S |
| I-2 | 5,6-$SCH_3$ | 5,6-$SCH_3$ | S |
| I-3 | 5,6-$SCH_3$ | H | O |
| I-4 | H | H | O |
| I-5 | 5,6-$OCH_3$ | 5,6-$OCH_3$ | S |
| I-6 | 5,6-$OCH_3$ | H | O |
| I-7 | 5-$OCH_3$, 6-Me | 5,6-$SCH_3$ | S |
| I-8 | 5,6-$OCH_3$ | 4,5-Benzo | S |
| I-9 | 5,6-$SCH_3$ | 4,5-Benzo | S |
| I-10 | 5-$OCH_3$, 6-Me | 4,5-Benzo | S |

TABLE II

[Structure with W-substituted benzothiazolium-ethyl connected via CH=CH chain to dimethylcyclohexene and thiazolidine group; X⁻ counterion]

| Dye | W | n |
|---|---|---|
| I-11 | 5,6-SCH$_3$ | 1 |
| I-12 | 5,6-OCH$_3$ | 1 |
| I-13 | H | 1 |
| I-14 | H | 0 |
| I-15 | 5,6-SCH$_3$ | 1 |
| I-16 | 5,6-OCH$_3$ | 1 |

An additional preferred class of infra-red sensitizers is given in Formula II:

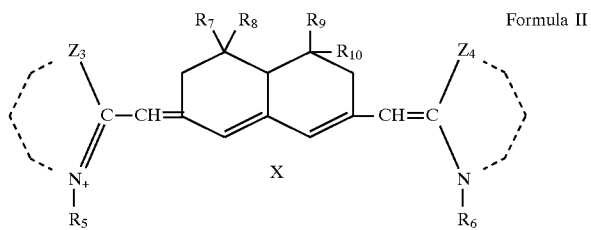

Formula II wherein:

- $Z_3$ and $Z_4$ each independently represents the atoms necessary to complete a substituted or unsubstituted 5- or 6-membered heterocyclic nucleus;
- $R_5$ and $R_6$ each independently represents substituted or unsubstituted alkyl or substituted or unsubstituted aryl;
- $R_7$, $R_8$, $R_9$, and $R_{10}$ each independently represents hydrogen, substituted or unsubstituted alkyl substituted or unsubstituted aryl; and
- X represents a counterion.

Examples of dyes according to Formula II are set forth below in Table III, IV and V, as taught in commonly assigned U.S. Pat. No. 5,108,882, the disclosure of which is incorporated herein by reference. These dyes give spectral sensitivity distributions exhibiting narrow bands with peak sensitivities in the infra-red and correspondingly low sensitivity in the visible region of the spectrum, as desired for the infra-red sensitive layer of this invention.

TABLE III

[Structure: benzothiazolium-($Z_3$, $R_5$) — CH=... — CH=benzoxazole-($Z_4$, $R_6$); X counterion]

| Dye | $Z_3$ | $Z_4$ | $R_5$ | $R_6$ |
|---|---|---|---|---|
| II-1 | H | H | Et | Me |
| II-2 | H | 4,5-Benzo | Et | Et |
| II-3 | H | 4.5-Benzo | Et | —(CH$_2$)$_3$SO$_3$— |
| II-4 | H | 5,6-Me | Et | Et |
| II-5 | 6-Me | 5,6-Me | Et | Et |
| II-6 | 5-OMe | 5,6-Me | Et | Et |
| II-7 | 4,5-Benzo | 5,6-Me | Et | Et |

TABLE IV

[Structure similar to Table III]

| Dye | $Z_3$ | $Z_4$ | $R_5$ | $R_6$ |
|---|---|---|---|---|
| II-8 | H | H | Et | Me |
| II-9 | 5-6-Benzo | 5-6-Benzo | Et | Et |

TABLE V

[Structure: benzothiazolium-($Z_3$, $R_5$) — CH=... — CH=indoline-($Z_4$, $R_6$); X⁻ counterion]

| Dye | $Z_3$ | $Z_4$ | $R_5$ | $R_6$ |
|---|---|---|---|---|
| II-10 | —H | —H | Et | Et |
| II-11 | 5-SMe | 5-SMe | Me | Me |
| II-12 | 5-OMe | 5-OMe | Et | Et |
| II-13 | 5,6-SMe | 5,6-SMe | Et | Et |

TABLE V-continued

| Dye | $Z_3$ | $Z_4$ | $R_5$ | $R_6$ |
|---|---|---|---|---|
| II-14 | 4,5-Benzo | 4,5-Benzo | Et | Et |

TABLE V-continued

| Dye | Z₃ | Z₄ | R₅ | R₆ |
|---|---|---|---|---|

II-21

II-22

Tricarbocyanine dyes and their methods of synthesis are well known in the art. Synthetic techniques for known tricarbocyanine dyes, such as set forth by Hamer, Cyanine Dyes and Related Compounds, John Wiley & Sons, 1964, apply equally as well to the dyes of Formula (II). Synthesis of the dyes of Formula (II) is also described in U.S. Pat. No. 3,582,344 and A. I. Tolmachev et al, Dokl. Akad. Nauk SSSR, 177, 869–872 (1967), the disclosures of which are incorporated herein by reference.

While Formulae I and II are examples of preferred embodiments, essentially any known spectral sensitizing dye sensitizing substantially in the infra-red portion of the spectrum is useful as a spectral sensitizer for the infra-red sensitive layer of this invention, including those described in one or more of the following references: U.S. Pat. Nos. 2,095,854; 2,095,856; 2,734,900; 2,955,939; 3,482,978; 3,552,974; 3,573,921; 4,975,362; 5,061,618; 5,037,734; Hamer, Cyanine Dyes and Related Compounds, John Wiley & Sons, 1964, as well as in Mees, The Theory of the Photographic Process, 3rd Ed. (MacMillan, 1966) pp. 198–201.

The infra-red sensitizing dyes disclosed above are added to photographic silver halide emulsions to form the infra-red sensitive layer of this invention. These silver halide emulsions can contain grains of any of the known silver halides, such as silver bromide, silver chloride, silver bromoiodide, and the like, or mixtures thereof, as described in *Research Disclosure,* Item 17632, December 1978 (hereinafter referred to as *Research Disclosure I*), Section I. The silver halide grains may be of any known type, such as spherical, cubic, or tabular grains, as described in *Research Disclosure I,* Section I, or *Research Disclosure,* Item 22534, January 1983. Because of their ability to record the high resolution, low granularity images desired for this invention, fine-grained silver halide emulsions, with equivalent spherical diameters of 0.5 μm or less, are especially preferred.

As is well known in the art, all of the emulsion types described in the preceding paragraph are rendered developable by exposure to radiation at wavelengths shorter than visible light, such as ultraviolet radiation at 365 nm. As a result, in an alternate embodiment, the emulsions are used to form a layer which responds to non-visible light in the short wavelength region of the spectrum. This layer is separated from the layers sensitized to the visible portion of the spectrum by coating it on the backside of the support. The support is highly absorptive of non-visible light in the short wavelength region of the spectrum and for exposures made from the backside, acts as a filter to prevent this non-visible light from exposing the layers sensitized to the visible portion of the spectrum.

The silver halide emulsions generally include a hydrophilic vehicle for coating the emulsion as a layer of a photographic element. Useful vehicles include both naturally-occurring substances such as proteins, protein derivatives, cellulose derivatives (e.g., cellulose esters), gelatin (e.g., alkali-treated gelatin such as cattle bone or hide gelatin, or acid-treated gelatin such as pigskin gelatin), gelatin derivatives (e.g., acetylated gelatin, phthalated gelatin, and the like), and others described in *Research Disclosure I*. Also useful as vehicles or vehicle extends are hydrophilic water-permeable colloids. These include synthetic polymeric peptizers, carriers, and/or binders such as poly(vinyl alcohol), poly(vinyl lactams), acrylamide polymers, polyvinyl acetals, polymers of allyl and sulfoalkyl acrylates and methacrylates, hydrolyzed polyvinyl acetates, polyamides, polyvinyl pyridine, methacrylamide copolymers, and the like as described in *Research Disclosure I*. The vehicle can be present in the emulsion in any amount known to be useful in photographic emulsions.

The emulsion can also include any of the addenda known to be useful in photographic emulsions. These include chemical sensitizers, such as active gelatin, sulfur, selenium, tellurium, gold, platinum, paladium, iridium, osmium, rhenium, phosphorous, or combinations thereof. Chemical sensitization is generally carried out at pAg levels of from 5 to 10, pH levels of from 5 to 8, and temperatures of from 30° to 80° C., as illustrated in *Research Disclosure,* June 1975, Item 13452 and U.S. Pat. No. 3,772,031.

Other addenda include brighteners, antifoggants, stabilizers, filter dyes, light absorbing or reflecting pigments, vehicle hardeners such as gelatin hardners, coating aids, dye-forming couplers, and development modifiers such as development inhibitor releasing couplers, timed development inhibitor releasing couplers, and bleach accelerators. These addenda and methods of their inclusion in emulsion and other photographic layers are well-known in the art and are disclosed in *Research Disclosure I* and the references cited therein. As disclosed in commonly assigned U.S. Pat. No. 5,108,882, a preferred embodiment of the infra-red sensitized emulsion layer contains one or more bis-azine compounds as supersensitizing addenda.

The emulsion layer containing silver halide sensitized with the dye of the invention can be coated simultaneously or sequentially with other emulsion layers, subbing layers, filter dye layers, or interlayers or overcoat layers, all of which may contain various addenda known to be included in photographic elements. These include antifoggants, oxidized developer scavengers, DIR couplers, antistatic agents, optical brighteners, light-absorbing or light-scattering pigments, and the like.

Color dye-forming couplers and the various addenda associated therewith are well-known in the art and are described, for example, in *Research Disclosure I,* Section VII, and the references cited therein. In the practice of this invention, it is required that the dye produced by the coupler in the layer sensitized to the non-visible portion of the spectrum absorb in regions of the spectrum not appreciably overlapping with the regions of absorption of the other color records, in order that the developed record of digital data not interfere with the viewing or printing of the color records providing the pictorial content of the film frame even when the digital and pictorial records are overlapping. In the preferred embodiments, this coupler forms dye whose absorption lies in the infra-red and whose development chemistry for the digital latent image is compatible with standard development procedures for photographic film as is well known and practiced in the art.

Preferred infra-red dye forming image couplers useful in the present invention are shown in the Table VI below:

TABLE VI

| Coupler No. | Structure |
|---|---|
| IR-1 |  |
| IR-2 | 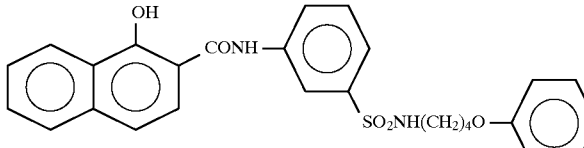 |
| IR-3 | 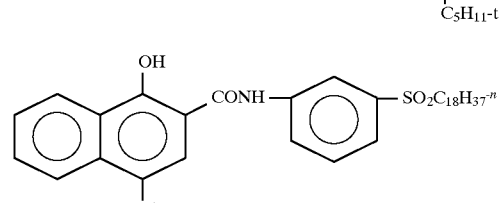 |
| IR-4 | 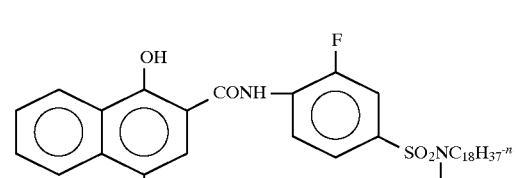 |
| IR-5 | 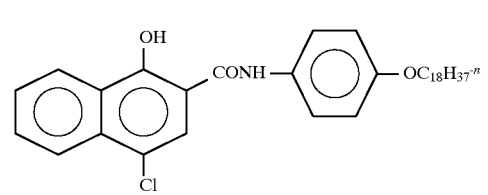 |

TABLE VI-continued

| Coupler No. | Structure |
|---|---|
| IR-6 | 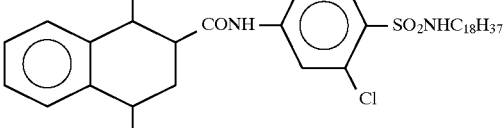 |
| IR-7 | 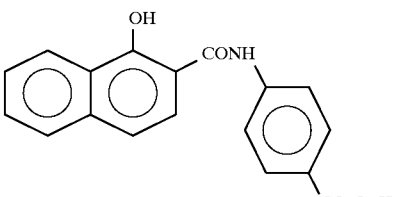 |
| IR-8 | 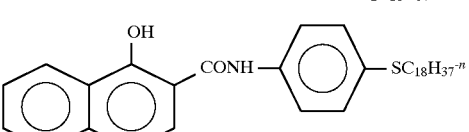 |
| IR-9 | 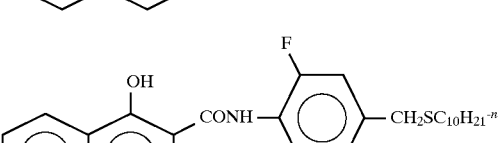 |

It is to be recognized that other classes of infra-red couplers may also serve the purposes of this invention and that the exact spectral absorption characteristics need not be critical as to spectrum or intensity of light transmitted through the developed layer either in regions of exposure or in regions where there is no exposure, because the data represented by the developed infra-red layer is digital in nature and is not subject to the need for exacting color balance as are dyes in the visible color record of conventional films.

The layers of the photographic element can be coated onto a support using techniques well-known in the art. These techniques include immersion or dip coating, roller coating, reverse roll coating, air knife coating, doctor blade coating, stretch-flow coating, and curtain coating, to name a few. The coated layers of the element may be chill-set or dried, or both. Drying may be accelerated by known techniques such as conduction, convection, radiation heating, or a combination thereof.

EXAMPLES

Specific illustrative examples of the film to be used in the practice of this invention are described below. However, the invention is not to be construed as being limited by these specific examples.

Example 1

Infra Red Light Sensitive Photographic Material

On a cellulose triacetate film support provided with a subbing layer plus an intermediate layer containing 4.89 g/m² gel, two layers having the composition set forth below were coated to prepare a color photographic infra-red light sensitive material which was designated sample 101. In the composition of the layers, the coating amounts are shown as g/m². The chemical formula of dye I-1 is given in Table 1 and the chemical formulae of dyes SD-2 and SD-3, bis-azine compound T-1, couplers IR-1, IR-2, C-1, M-1 and Yel-1, solvents S-1 and S-2, and hardener H-1 are given in Table VII.

First Layer: Infra-red Light Sensitive Layer

The light sensitive element in this layer is a cubic AgBr emulsion, 0.25 $\mu$m in edge length, sulfur and gold sensitized, and spectrally sensitized to infra-red light with a $4.2 \times 10^{-5}$ mole/mole Ag of dye I-1. The emulsion also contained as addenda $7.8 \times 10^{-4}$-mole/mole Ag of the bis-azine supersensitizer T-1 and a substituted tetraazaindene antifoggant.

| | |
|---|---|
| Silver Bromide Emulsion | 0.81 (as silver) |
| Infra-red Coupler IR-1 | 0.86 |
| dispersed in solvent S-1 | 0.86 |
| Gelatin | 2.37 |
| Second Layer: Overcoat Layer | |
| Gelatin | 0.97 |
| Matte Beads | 0.02 |
| Hardener H-1 | 0.12 |

Sample 102 was prepared in the same manner as described above for sample 101 except for the change in coupler in the first layer listed in Table VIII. All couplers were coated at 0.86 g/m².

Example 2

Green Light Sensitive Photographic Material

On a cellulose triacetate film support with a subbing layer plus an intermediate layer containing 4.89 g/m² gel two layers having the composition set forth below were coated. The green light sensitive photographic material was designated sample 201. In the composition of the layers, the coating amounts are shown as g/m².

First Layer: Green Light Sensitive Layer

The light sensitive element in this layer is a tabular AgBrI emulsion with 4.5% bulk iodide, 1.05 μm in diameter and 0.12 μm thick. The emulsion was sulfur and gold sensitized and spectrally sensitized to green light with $6 \times 10^{-4}$ mole/mole Ag of dye SD-2 and $2 \times 10^{-4}$ mole/mole Ag of dye SD-3.

| | |
|---|---|
| Silver Iodobromide Emulsion | 0.81 (as silver) |
| Magenta Coupler M-1 | 0.86 |
| dispersed in solvent S-2 | 0.43 |
| Gelatin | 2.37 |
| Second Layer: Overcoat Layer | |
| Gelatin | 0.97 |
| Matte Beads | 0.02 |
| Hardener H-1 | 0.12 |

Samples 202 and 203 were prepared in the same manner as described above for sample 201 except for the change in coupler in the first layer, listed in Table VIII All couplers were coated at 0.86 g/m².

TABLE VII

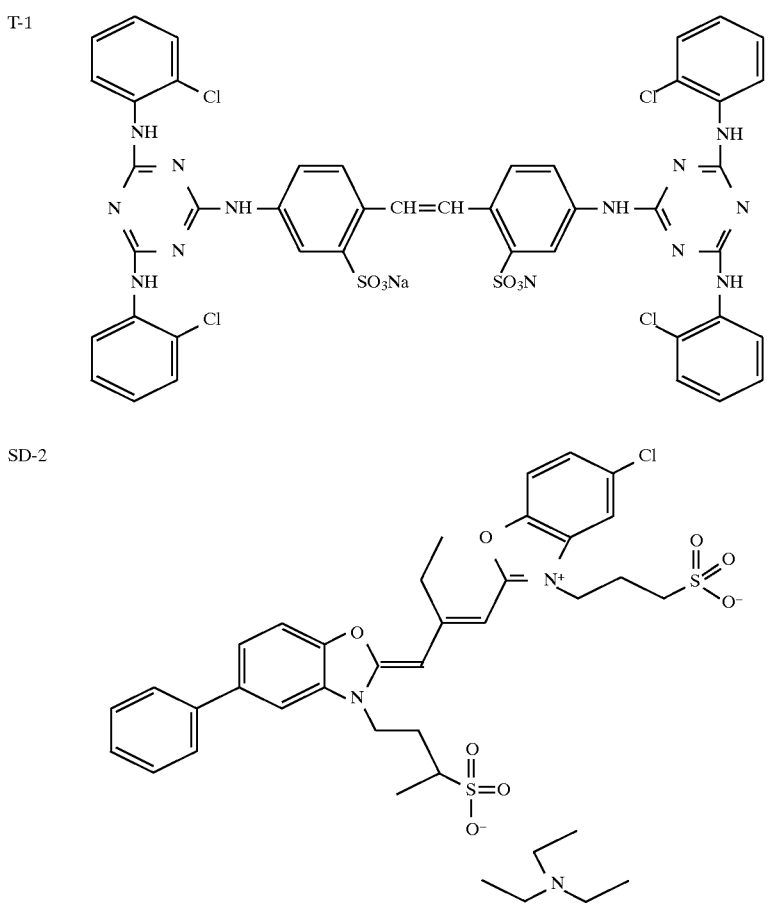

TABLE VII-continued
SD-3
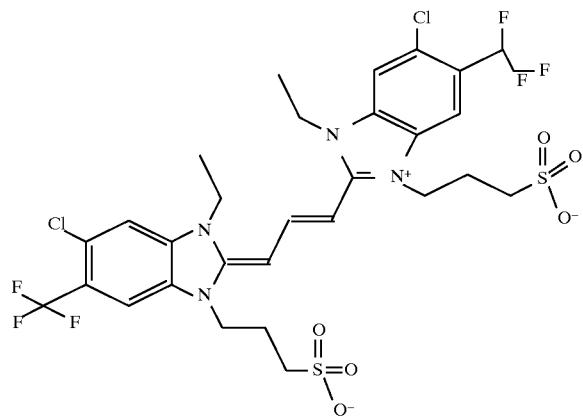
IR-1
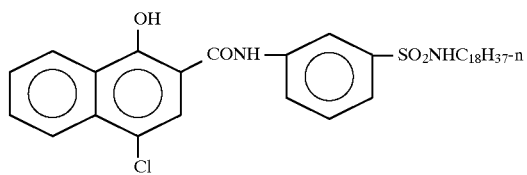
IR-2
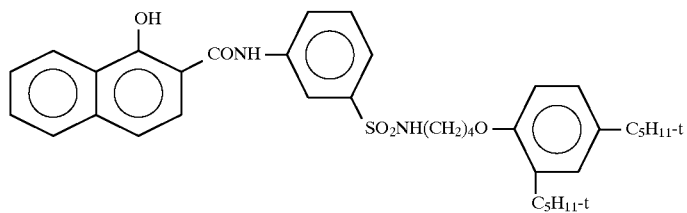
M-1
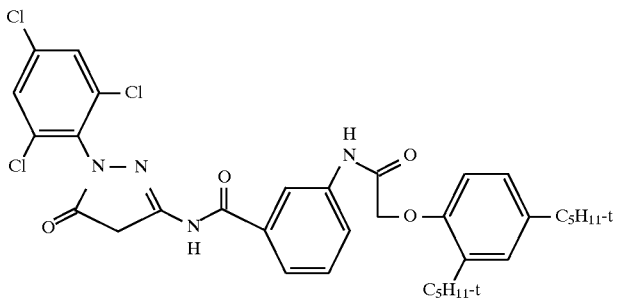
C-1
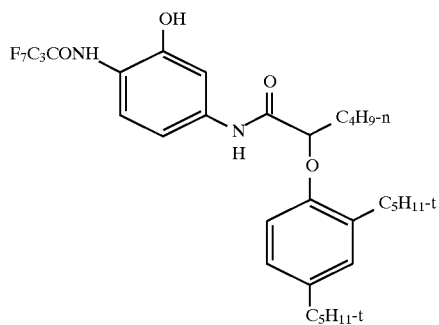

TABLE VII-continued

YEL-1

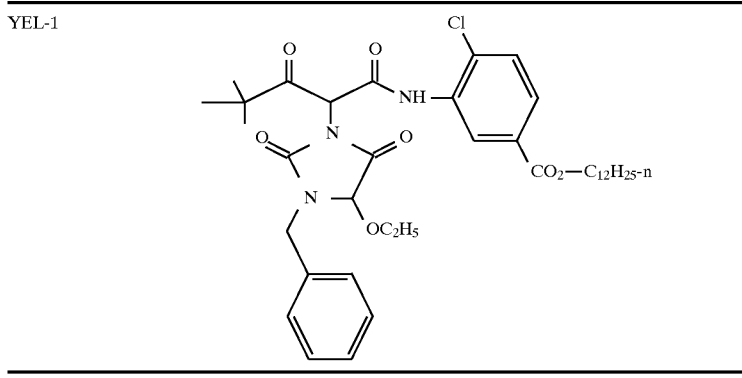

Solvent S-1: tri-(2-ethylhexyl)phosphate
Solvent S-2: Phosphoric acid, tris(methylphenyl) ester
Hardener H-1: bis(vinylsulfonyl) methane Each of the samples thus prepared were cut into 35 mm width strips. The samples were given a 1 second stepped exposure to a simulated daylight light source through a Kodak Wratten 89B filter. This filter blocks blue, green, and red light but passes infra-red light. The simulated daylight light source conforms to American National Standard for Simulated Daylight ANSI PH2.29-1987 (R-1976). The spectral characteristics of Kodak Wratten 89B filter are described in "Kodak Filters for Scientific and Technical Uses, Publication B-3.

After exposure, the samples were processed using Kodak C-41 processing solutions to produce a negative image. The developer processing time was 3 minutes and 15 seconds. The samples were also processed using Kodak E-6 processing solutions to produce a reversal image. However, the first developer processing time was reduced from the standard 6 minutes to 4 minutes to compensate for the rapid development rate of a single layer light sensitive photographic material. Kodak process C-41 and E-6 are described in the British Journal of Photography Annual 1988.

For all samples, the Status A red, green, and blue densities were measured for all of the steps. A spectrophotometric analysis was also performed on all steps. Methods used to obtain Status A densities are described in James, editor, The Theory of the Photographic Process, 4th Edition, MacMillen, New York, 1977, Chapter 18.

After 1 second exposure through a Kodak Wratten 89B filter, infra-red sensitized samples 101 through 102 produced a photographic sensitometric scale in both C-41 and E-6 processes. However, green sensitized samples 201 through 203 produced no sensitometric scale since these samples contained no infra-red sensitive emulsion.

When samples 201 through 203 were given a 1/25 second stepped exposure to a simulated daylight light source through Kodak Wratten 2C plus Wratten 12 filters (described in Kodak Publication B-3), they produced a photographic sensitometric scale in both C-41 and E-6 processes. These filters remove blue light but pass red and green light and therefore caused exposure to the green sensitized emulsion.

Selected data from the spectrophotometric analysis of the E-6 processed film is shown in Table VIII. Similar data were obtained from the C-41 processed film leading to the data in Table IX.

TABLE VIII

B-6 Process Data

| Sample | Coupler | λmax | Density Ratio | | | | |
|---|---|---|---|---|---|---|---|
| | | | 750 nm | 700 nm | 650 nm | 550 nm | 450 nm |
| 101 | IR-1 | 810 nm | .71 | .57 | .33 | .06 | .08 |
| 102 | IR-2 | 830 nm | .73 | .63 | .37 | .06 | .08 |
| 201 | M-1 | 550 nm | .03 | .04 | .07 | 1.00 | .17 |
| 202 | C-1 | 660 nm | .33 | .81 | .99 | .21 | .08 |
| 203 | YEL-1 | 450 nm | .03 | .03 | .03 | .05 | 1.00 |

TABLE IX

C-41 Process Data

| Sample | Coupler | λmax | Density Ratio | | | | |
|---|---|---|---|---|---|---|---|
| | | | 750 nm | 700 nm | 650 nm | 550 nm | 450 nm |
| 101 | IR-1 | 700 nm | .74 | 1.00 | .82 | .07 | .11 |
| 102 | IR-2 | 720 nm | .87 | .96 | .56 | .08 | .08 |
| 202 | C-1 | 670 nm | .43 | .90 | .96 | .14 | .08 |

In Tables VIII and IX, λmax refers to the wavelength (nanometer units) at which maximum spectral density occurs. Density ratio is defined as the spectral density at the wavelength indicated in the table divided by the spectral density at λmax.

In this invention, an infra-red coupler is defined as one that forms dye whose spectral density ratio at any wavelength greater than or equal to 700 nm exceeds its density ratio at all wavelengths below 700 nm. Such couplers can be electronically detected by infra-red sensors. Such couplers produce infra-red absorbing dyes whose unwanted absorption at visible wavelengths is lower than their absorption at infra-red wavelengths. Information from such couplers can easily be distinguished and subtracted from cyan, magenta, and yellow visible imaging couplers by electronic and/or digital means, as is well known in the art. The interference information from these couplers at visible wavelengths can be more accurately subtracted out of the signal from visible dye forming couplers as the infra-red dye's contribution at visible wavelengths becomes smaller. An ideal infra-red coupler would have substantially no absorption at visible wavelengths. In this case, no electronic correction for unwanted absorption would be needed.

The density ratios listed in Table VIII and Table IX show that infra-red couplers IR-1 and IR-2 satisfy the requirements of an infra-red coupler in this invention in both C-41 and E-6 processes as compared to couplers C-1, M-1, and YEL-1.

Figure 6A:
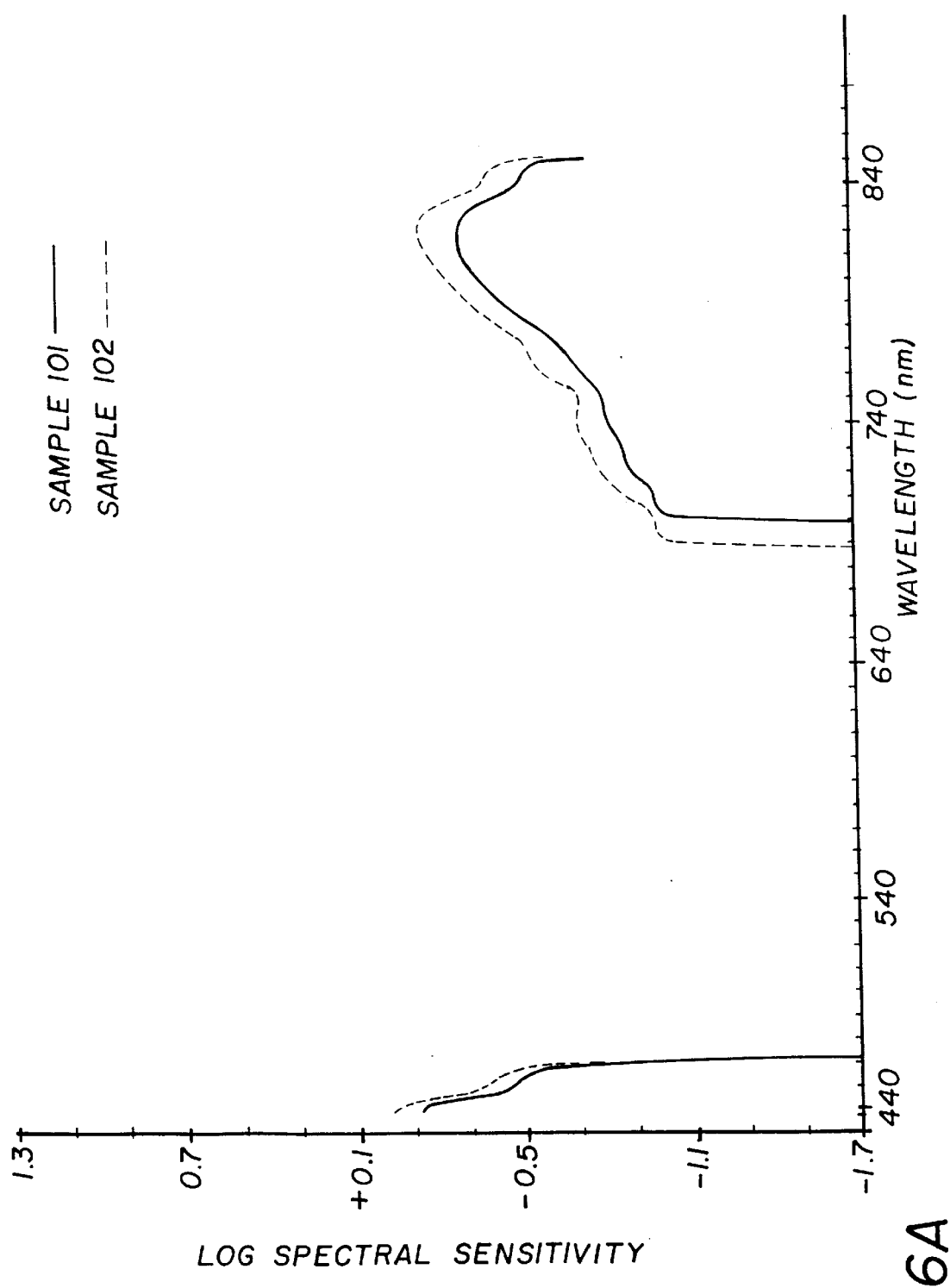
FIGS. 6a and 6b show relative log spectral sensitivities for the layers of films exposed in accordance with this invention.
Figure 6B:
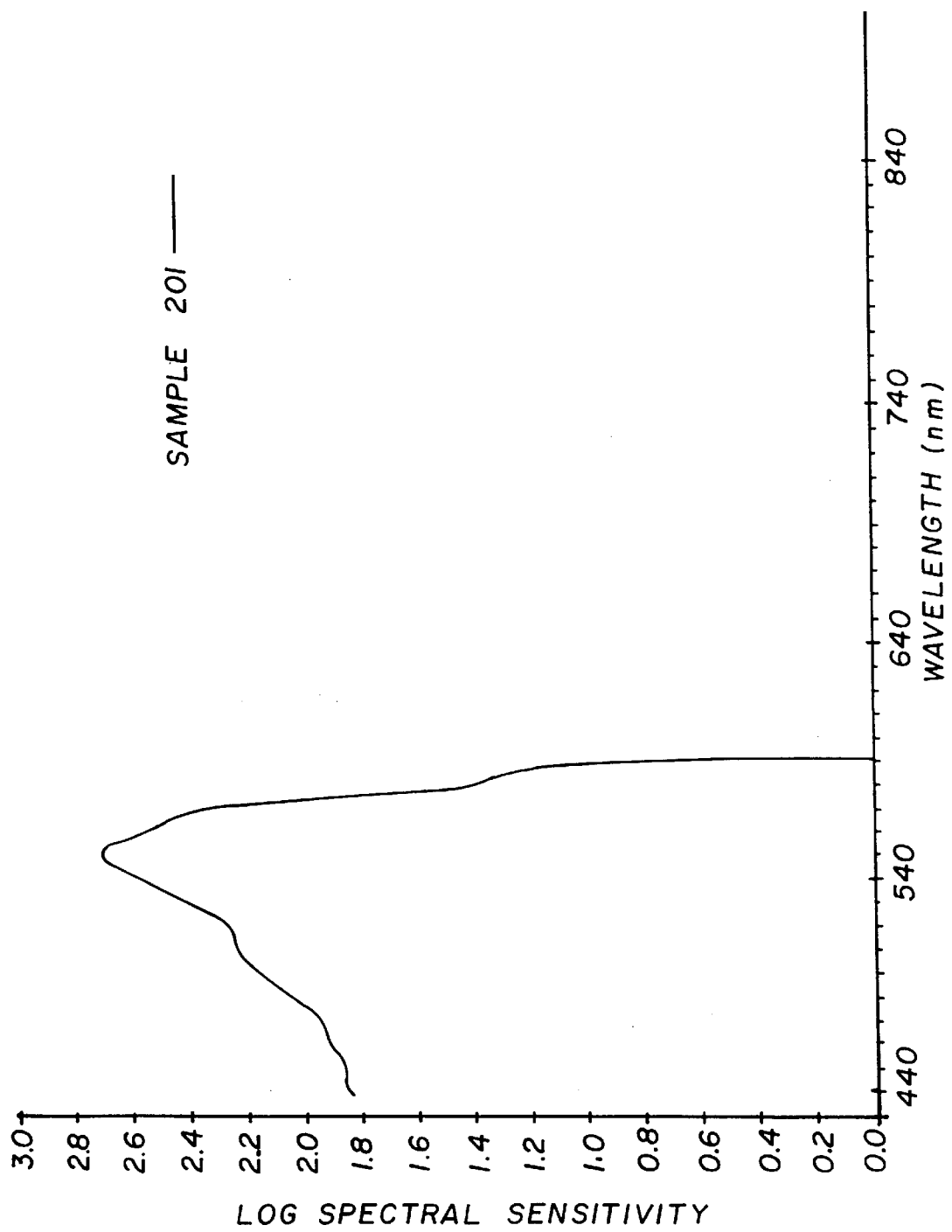

To determine the spectral sensitivity distributions of samples 101, 102, and 201, the samples were exposed on a wedge spectrographic instrument which covers the wavelength range from 440 nm to 840 nm. The instrument contains a tungsten light source and a step tablet ranging in density from 0 to 3 density units in 0.3 density steps. Samples 101 and 102 were exposed for 2 seconds while sample 201 was exposed for $\frac{1}{25}$ second. After exposure and processing in Kodak C-41 processing solutions, speed was read at 10 nm intervals at a density of 0.3 above fog. Correction for the instrument's variation in spectral irradiance with wavelength was done via computer. Plots of log relative spectral sensitivity of samples 101, 102 and 201 are shown as a function of wavelength in FIGS. 6a and 6b. An approximate correction for the exposure time difference is also included in these plots. The plots illustrate the photographic sensitivity of the infra-red sensitized emulsion at wavelengths longer than 700 nm and the insensitivity of the emulsion at visible wavelengths below 700 nm. In the same way, the green sensitized emulsion in sample 201 shows its photographic sensitivity toward visible light and its lack of sensitivity toward infra-red light. These data illustrate that samples 101 and 102 can be selectively exposed apart from sample 201 by using infra-red light at wavelengths above 700 nm. Likewise, sample 201 can be selectively exposed apart from sample 101 or 102 by using green light.

The infra-red sensitized emulsion also has some intrinsic sensitivity to blue light at wavelengths below 480 nm. This sensitivity can be removed in a photographic material by means well known in the art such as Carey Lea Silver coated in an interlayer positioned anywhere between the light source and the infra-red sensitized layer. Alternatively, a blue light imaging layer can be positioned between the light source and the infra-red layer thereby absorbing blue light and preventing blue light exposure to the infra-red layer.

A further way of preventing blue exposure of the infra-red sensitive layer is to choose an infra-red sensitive emulsion which has an overall low sensitivity to light exposure. In this case, the amount of blue light needed to expose this infra-red sensitive layer can be made to be much larger than the light needed to expose the blue light imaging layers used to form the conventional pictorial image. The blue light imaging layers can thus be exposed without exposing the infra-red sensitive layer. Exposure of the infra-red sensitive emulsion by the infra-red exposure will still be possible, since the amount of infra-red light employed by this exposure can be adjusted to compensate for the low overall sensitivity of the infra-red emulsion. Such low sensitivity emulsions can be produced by techniques well known in the art, including the use of emulsions with equivalent spherical diameters below 0.3 $\mu$m, incorporation of desensitizing metal ion dopants, adjustment of chemical sensitization procedures, and addition of desensitizing addenda.

These examples demonstrate the practice of this invention since multilayer photographic materials can be constructed by adding a layer containing an infra-red sensitized emulsion with an infra-red image coupler to a conventional multilayer photographic material having one or more layers with conventional image couplers and emulsions sensitized to visible light. By this arrangement, information can be written separately to the infra-red layer using infra-red light. After processing the photographic material using standard process solutions, the information recorded by the infra-red imaging coupler can be electronically separated from the non-infra-red image by scanning and processing algorithms well known in the art. For example, methods to subtract unwanted spectral absorptions from dye sets are described in Hunt, The Reproduction of Color, 4th Edition, Fountain Press, England, Chapter 14.

In the practice of this invention, the spectral absorption of the infra-red coupler should differ from that of all visible image couplers used in the photographic material so that the dye information recorded by the infra-red layer can be distinguished from the dye information recorded by all visible imaging layers in the photographic material.

In an ideal case where the infra-red exposure to the infra-red layer is constant and binary, as in recording dots for digital information, the unwanted absorption of the infra-red dye can be pre-determined as a function of visible wavelength, stored in a computer, and computationally subtracted from an image signal at visible wavelengths. This is particularly applicable in cases where the infra-red exposure occurs in predetermined spatial locations, for example, in a grid array of dots produced by an array of light emitters, all of equal size, shape, and emission intensity.

If the infra-red exposure is not constant, techniques well known in the art that draw upon the pre-determined spectral absorptions of all dyes present in the film may be used to subtract the contribution of the unwanted infra-red dye at visible wavelengths from the image signal at visible wavelengths. (Hunt, Chapter 14).

If it is desirable to produce a visible image in the photographic material that is suitable for direct viewing, ideally an infra-red coupler would be chosen that produces a dye having substantially no absorption at visible wavelengths.

Since most infra-red couplers will produce dye having some unwanted absorption in the visible region which compromises the direct viewing properties of the photographic material, the infra-red dye may be removed after its information is scanned and recorded. For example, if the infra-red layer was coated on the opposite side of the support from the visible imaging layers, its image can be removed by bleaching the infra-red dye for 30 to 60 seconds using a permanganate-sulfuric acid retouching bleach described in Kodak Publication E68 applied selectively to the infra-red layer only. Other total bleaches known in the art may also be used.

Other methods can be used to completely remove the infra-red layer from the photographic material. For example, a gelatin based infra-red layer may be removed by enzymolysis using a Takamine solution. It may also be removed using a 5% hypochlorite solution. Alternatively, if the infra-red layer were coated in an organic binder, suitable organic solvents may be used to dissolve the binder and wash the layer off the photographic material. Alternatively suitable organic solvents may be used to soak the dye out of the infra-red layer while leaving the layer otherwise intact.

The invention has been described in detail with particular reference to certain preferred embodiments thereof, but it will be understood that variations and modifications can be effected within the spirit and scope of the invention.

Parts List

10 film strip
12 top color sensitive layer
14 middle color sensitive layer
16 bottom color sensitive layer
18 record layer
19 film base 20 film region
30 microphone
32 infra-red signal source receiver
34 radio frequency source receiver
36 direct interconnect port
37 lens
38 receiver
39 selector switch
40 semiconductor processing circuit
41 exposure gate
42 data buffer
44 logic circuit
50 linear LED array
51 driver circuit
53 LED array
55 wirebonds
64 array advance means
65 encoder track
66 encoder reader
72 verify buffer button
73 record buffer button
74 record data button
76 verify first button
82 speaker

We claim:

1. A camera for recording overlapping visible images and non-visible digital data, the camera comprising:

means for exposing a region of a film with visible light to record a visible image in at least one record layer sensitized to visible light; and means for exposing in the region of the film with non-visible light to record non-visible digital data in at least one record layer sensitized to non-visible light, whereby overlapping visible images and non visible digital data are recorded in the region.

2. The invention of claim 1 wherein when non-pictorial digital information is recorded in one or more photographic film record layer(s) of the region, pictorial information is recorded in the region in another photographic film record layer(s) not containing non-pictorial digital information.

3. The invention as set forth in claim 1 further including devices for producing non-visible light including GaAs, InP, AlGaInAs or GaInP material.

4. The invention of claim 2 further including means of synchronizing recording of digital data with motion of the film during the recording process.

5. The camera of claim 3 further including means for storing digital information and means responsive to such stored information for selectively activating the optical recording means, and means for buffering the digital information selectively recorded by the activated optical recording means prior to recording.

6. The invention as set forth in claim 1 wherein the non-visible light is provided by infrared exposing means including a plurality of semiconductor light emitting devices.

7. In a photographic camera for recording images of a subject on photographic film, the photographic film having one or more record layer(s) sensitized to non-visible light; one or more record layer(s) sensitized to visible light and not exposable by the non-visible light exposing the record layer(s) sensitized to non-visible-light; and the visible light sensitized record layer(s) being rendered, upon exposure and development so as to produce image dyes that are absorptive of light at visible wavelengths; the non-visible light sensitized record layer(s) being rendered, upon exposure and development, so as to produce image dyes that are absorptive of light at non-visible wavelengths and substantially less absorptive of visible light than the image dyes produced in the exposed and developed record layer(s) sensitized to visible light, the camera comprising:

(a) means for advancing the photographic film; and (b) optical recording means including for exposing the non-visible light sensitized record layer(s) with non-visible radiation in an area of the photographic film; and for exposing the visible light sensitized record layer(s) with visible radiation in the area of the photographic film whereby in the photographic film, there are exposed record layer(s) sensitized to visible light overlapped with exposed record layers sensitized to non-visible light.

8. In a photographic camera for recording images of a subject on photographic film, the photographic film having one or more record layer(s) sensitized to infrared light; one or more record layer(s) sensitized to visible light and not exposable by the infrared light exposing the record layer(s) sensitized to infrared light; and the visible light sensitized record layer(s) being rendered, upon exposure and development, so as to produce image dyes that are absorptive of light at visible wavelengths; the infrared light sensitized record layer(s) being rendered, upon exposure and development, so as to produce image dyes that are absorptive of light at infrared wavelengths and substantially less absorptive of visible light than the image dyes produced in the exposed and developed record layer(s) sensitized to visible light, the camera comprising:

(a) means for advancing the photographic film; and (b) optical recording means including:

(i) semiconductor light emitting means for exposing the infrared sensitized record layer(s) in an area of the photographic film with infrared radiation representing digital data; and (ii) means for focusing visible light from an image scene onto the area of the photographic film and exposing the visible light sensitized layer(s) in such area with scene information whereby in the photographic film, the digital information recorded in the infrared light sensitized layer(s) is overlapped with the scene information recorded in the visible light sensitized layer(s).

* * * * *